(12) United States Patent
Sterling et al.

(10) Patent No.: US 12,025,131 B2
(45) Date of Patent: Jul. 2, 2024

(54) TORQUE TRANSFER GEAR PUMP

(71) Applicant: DEERE & COMPANY, Moline, IL (US)

(72) Inventors: Andrew T. Sterling, Cedar Falls, IA (US); Jacob H. Tayloe, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/818,229

(22) Filed: Aug. 8, 2022

(65) Prior Publication Data
US 2024/0044331 A1    Feb. 8, 2024

(51) Int. Cl.
| F01C 1/18 | (2006.01) |
| F03C 2/00 | (2006.01) |
| F03C 4/00 | (2006.01) |
| F04C 2/00 | (2006.01) |
| F04C 2/10 | (2006.01) |
| F04C 2/12 | (2006.01) |
| F04C 15/00 | (2006.01) |
| F04C 11/00 | (2006.01) |

(52) U.S. Cl.
CPC .............. *F04C 2/12* (2013.01); *F04C 2/102* (2013.01); *F04C 15/0065* (2013.01); *F04C 11/001* (2013.01)

(58) Field of Classification Search
CPC .... F04C 2/08; F04C 2/102; F04C 2/12; F04C 11/001; F04C 15/0061; F04C 15/0065; F04C 18/08; F04C 18/082; F04C 18/12; F04C 23/001; F04C 29/005; F04C 29/0057
See application file for complete search history.

(56) References Cited

U.S. PATENT DOCUMENTS

| 1,083,329 A | 1/1914 | Vincenzo |
| 1,953,068 A | 4/1934 | Barker |
| 2,842,006 A | 7/1958 | Edman |
| 4,386,893 A | 6/1983 | Hauser, Jr. |

(Continued)

FOREIGN PATENT DOCUMENTS

| CN | 105805528 A | 7/2016 |
| DE | 3600871 A1 | 7/1987 |

(Continued)

OTHER PUBLICATIONS

KR100372110B1—Hyundai Motor Company—Oil Pump Combination Apparatus—Feb. 14, 2003—the English Machine Translation. (Year: 2003).*
German Search Report issued in application No. 102023118095.9, dated Feb. 14, 2024, 8 pages.

*Primary Examiner* — Theresa Trieu

(57) ABSTRACT

A drivetrain component including a first gear positioned on a first shaft configured to receive torque from a power source, a second gear positioned on a second shaft, and a housing partially surrounding the first and second gears. The second gear is engaged with the first gear transmitting torque from the first shaft to the second shaft. The second shaft is configured to transfer torque received from the first shaft to an additional drivetrain component. The housing includes an inlet and an outlet. Rotation of the first and second gears transfers fluid from the inlet to the outlet.

14 Claims, 11 Drawing Sheets

(56) References Cited

U.S. PATENT DOCUMENTS

| | | | |
|---|---|---|---|
| 4,662,490 A | 5/1987 | Yamakawa | |
| 6,454,552 B1 * | 9/2002 | Hansen | F04C 18/126 418/206.7 |
| 8,894,385 B2 | 11/2014 | Goss et al. | |
| 9,567,999 B2 | 2/2017 | Ferretti et al. | |
| 10,000,895 B2 | 6/2018 | Beckhusen | |
| 10,808,696 B2 | 10/2020 | Tsuzuki | |
| 2004/0107940 A1 | 6/2004 | Elliott et al. | |
| 2007/0098586 A1 | 5/2007 | Clark | |
| 2012/0219447 A1 * | 8/2012 | Shah | F04C 15/0057 418/102 |
| 2017/0184193 A1 * | 6/2017 | Kaemmerer | F16H 57/0409 |

FOREIGN PATENT DOCUMENTS

| | | | |
|---|---|---|---|
| DE | 10335397 A1 | 3/2005 | |
| DE | 102007029469 A1 | 1/2009 | |
| DE | 102017207584 A1 | 11/2018 | |
| DE | 102018005584 A1 | 1/2020 | |
| DE | 102019210512 A1 | 1/2021 | |
| GB | 2114228 A * | 8/1983 | F01C 11/00 |
| JP | S60176822 A | 9/1985 | |
| JP | H04351366 A | 12/1992 | |
| KR | 100372110 B1 * | 2/2003 | F04C 2/08 |
| WO | WO2014178483 A1 | 11/2014 | |

* cited by examiner

TORQUE TRANSFER GEAR PUMP

FIELD OF THE DISCLOSURE

The present disclosure relates to a torque transfer gear pump.

BACKGROUND

Many vehicles include drivetrains, which couple a power source, such as an internal combustion engine, to one or more wheels or other ground engagement apparatus. Drivetrains can include one or more sets of gears to transmit torque from the power source to the ground engagement apparatus. Vehicles can also include a gear pump to transfer fluid.

SUMMARY

According to an aspect of the present disclosure, a drivetrain component includes a first gear positioned on a first shaft configured to receive torque from a power source, a second gear positioned on a second shaft, and a housing partially surrounding the first and second gears. The second gear is engaged with the first gear transmitting torque from the first shaft to the second shaft. The second shaft is configured to transfer torque received from the first shaft to an additional drivetrain component. The housing includes an inlet and an outlet. Rotation of the first and second gears transfers fluid from the inlet to the outlet.

According to an aspect of the present disclosure, a drivetrain component includes a first shaft including a first gear, a second shaft including a second gear engaged with the first gear, and a housing partially surrounding the first and second gears. The first shaft is configured to receive torque from a power source. The second shaft is configured to transfer torque received from the first shaft to an additional drivetrain component. The housing includes an inlet and an outlet. The first and second gears are configured to transfer fluid from the inlet to the outlet.

According to an aspect of the present disclosure, a work vehicle includes a power source, a first drivetrain component, and a second drivetrain component. The first drivetrain component includes a first shaft having a first gear receiving torque from the power source, a second shaft having a second gear engaged with the first gear, and a housing partially surrounding the first and second gears. The second shaft transfers the torque received from the first shaft to the second drivetrain component. The housing includes an inlet and an outlet. Rotation of the first and second gears transfers fluid from the inlet to the outlet.

The above and other features will become apparent from the following detailed description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

The implementations disclosed in the above drawings and the following detailed description are not intended to be exhaustive or to limit the present disclosure to these implementations.

Figure 1:
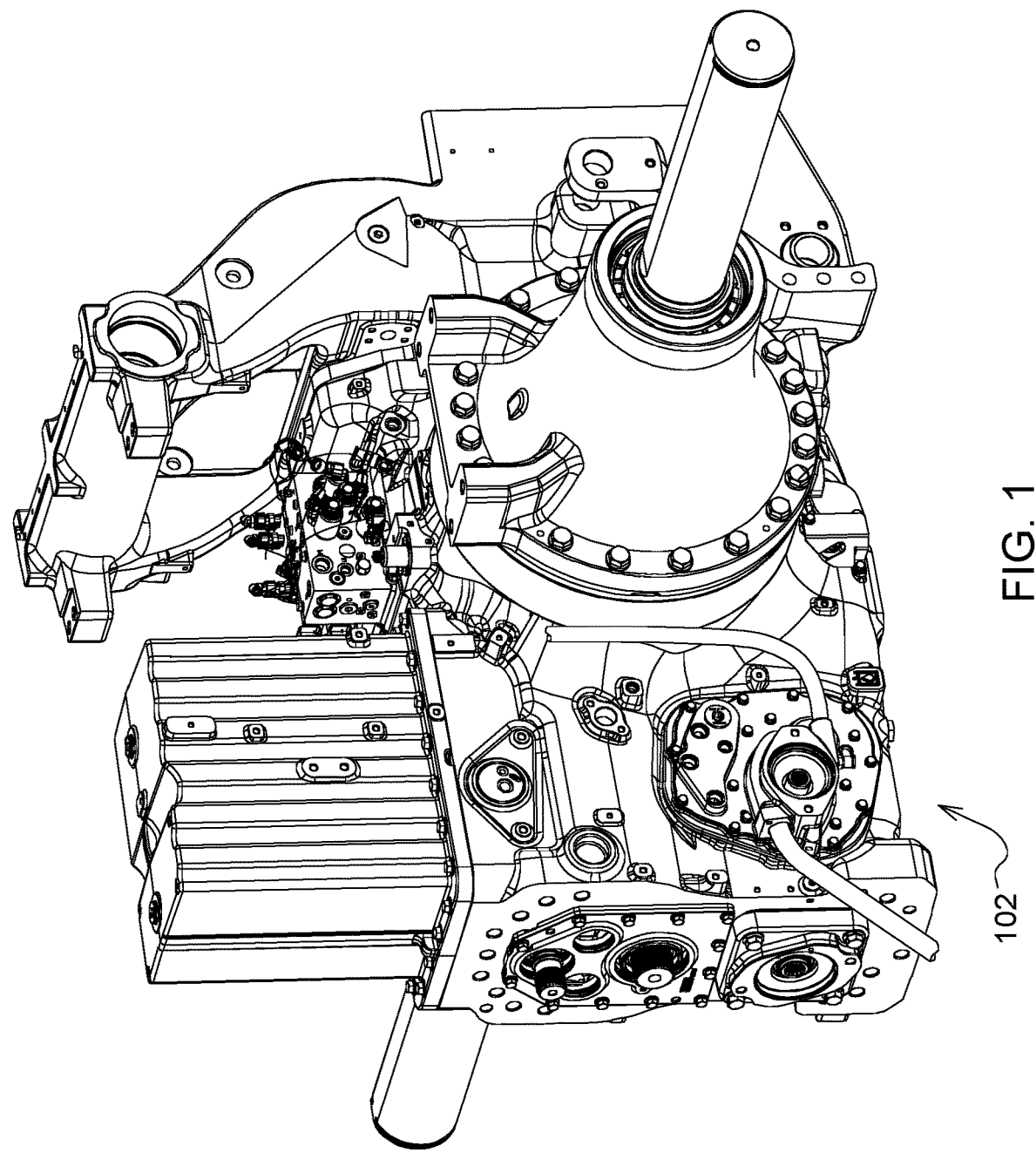
FIG. 1 is a perspective view of a drivetrain component, according to an implementation.
Figure 2:
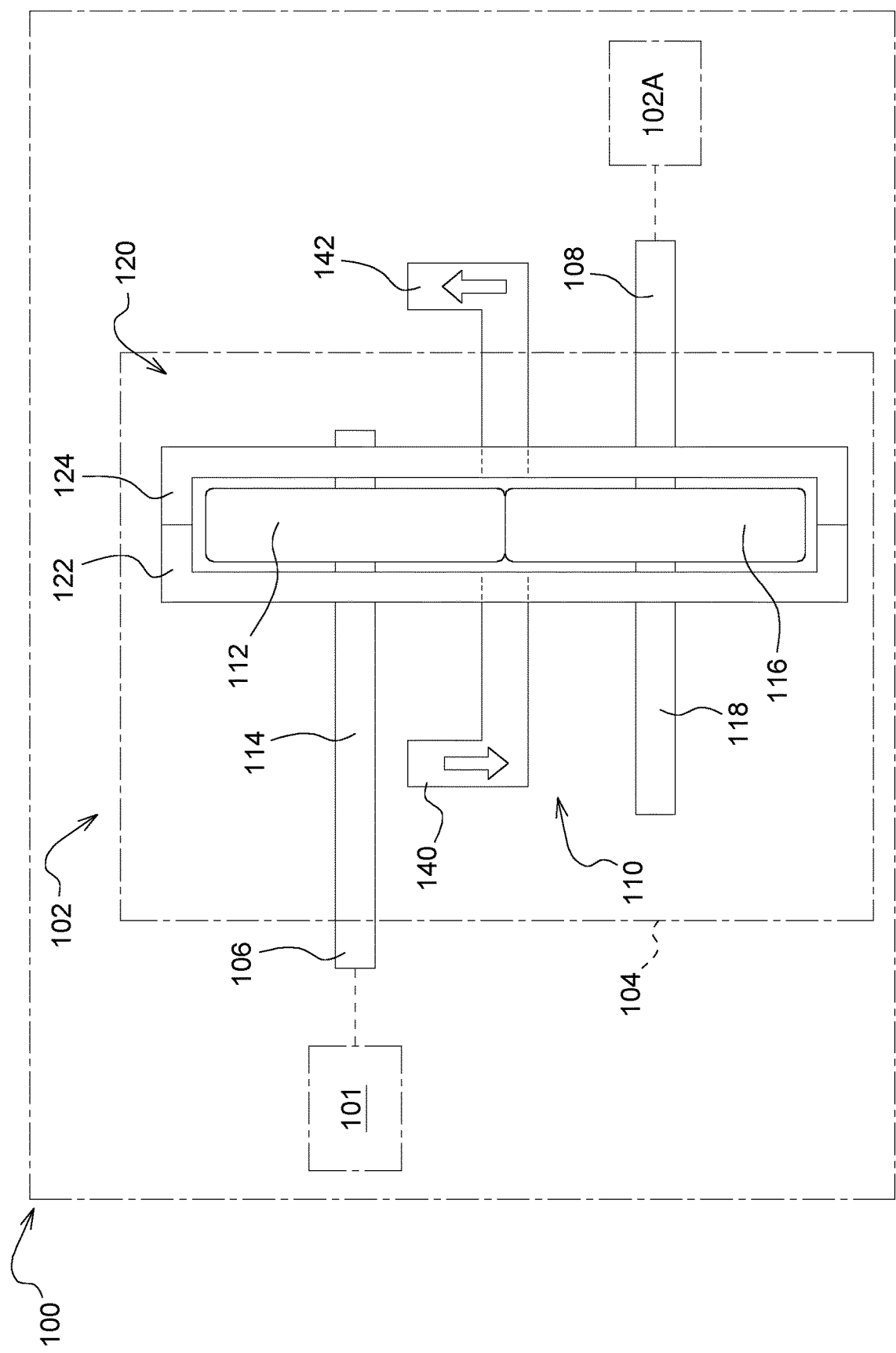
FIG. 2 is a schematic view of a drivetrain component, according to an implementation.
Figure 3:
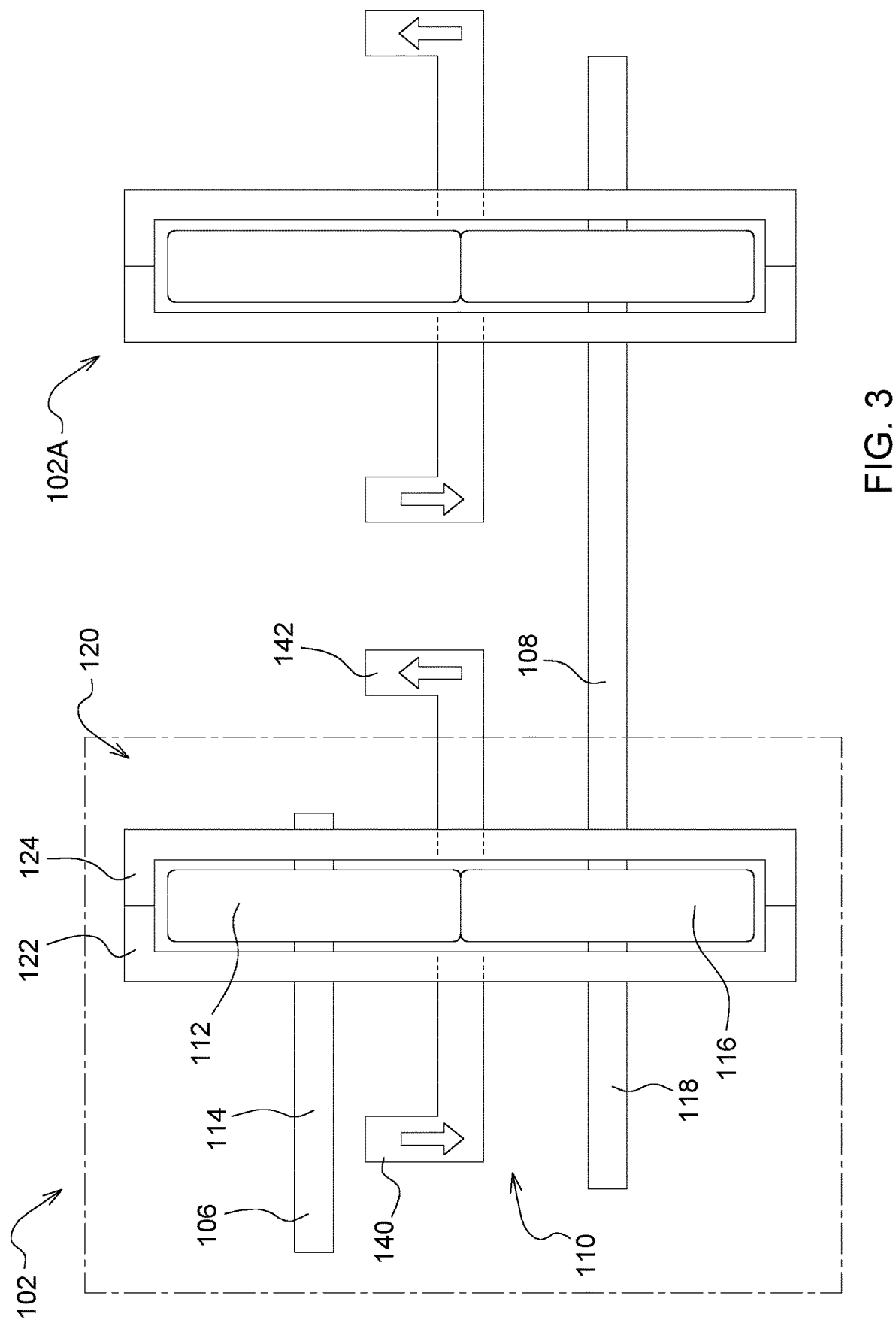
FIG. 3 is a schematic view of a drivetrain component, according to an implementation.
Figure 4:
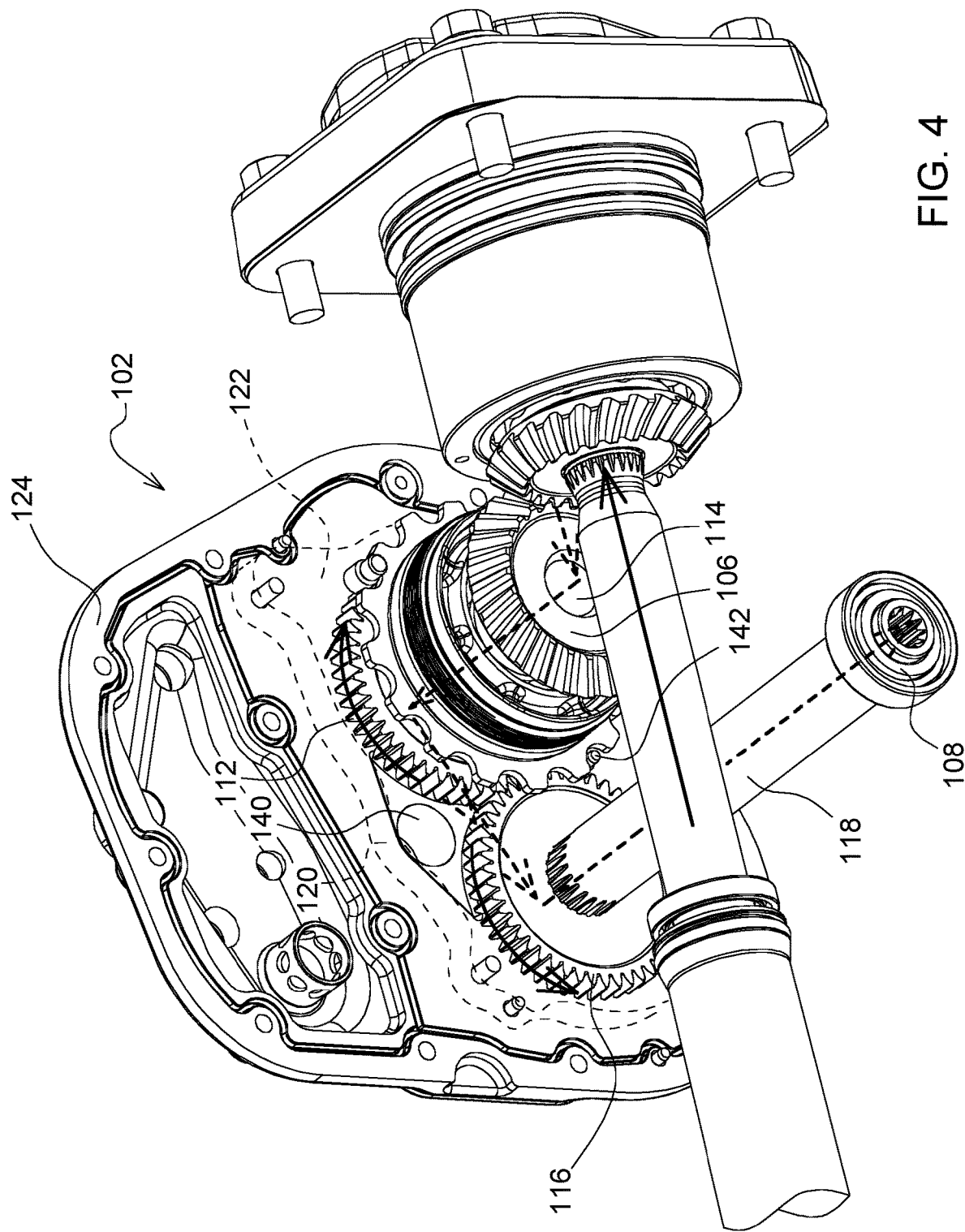
FIG. 4 is a rear perspective view of a drivetrain component, according to an implementation.
Figure 5:
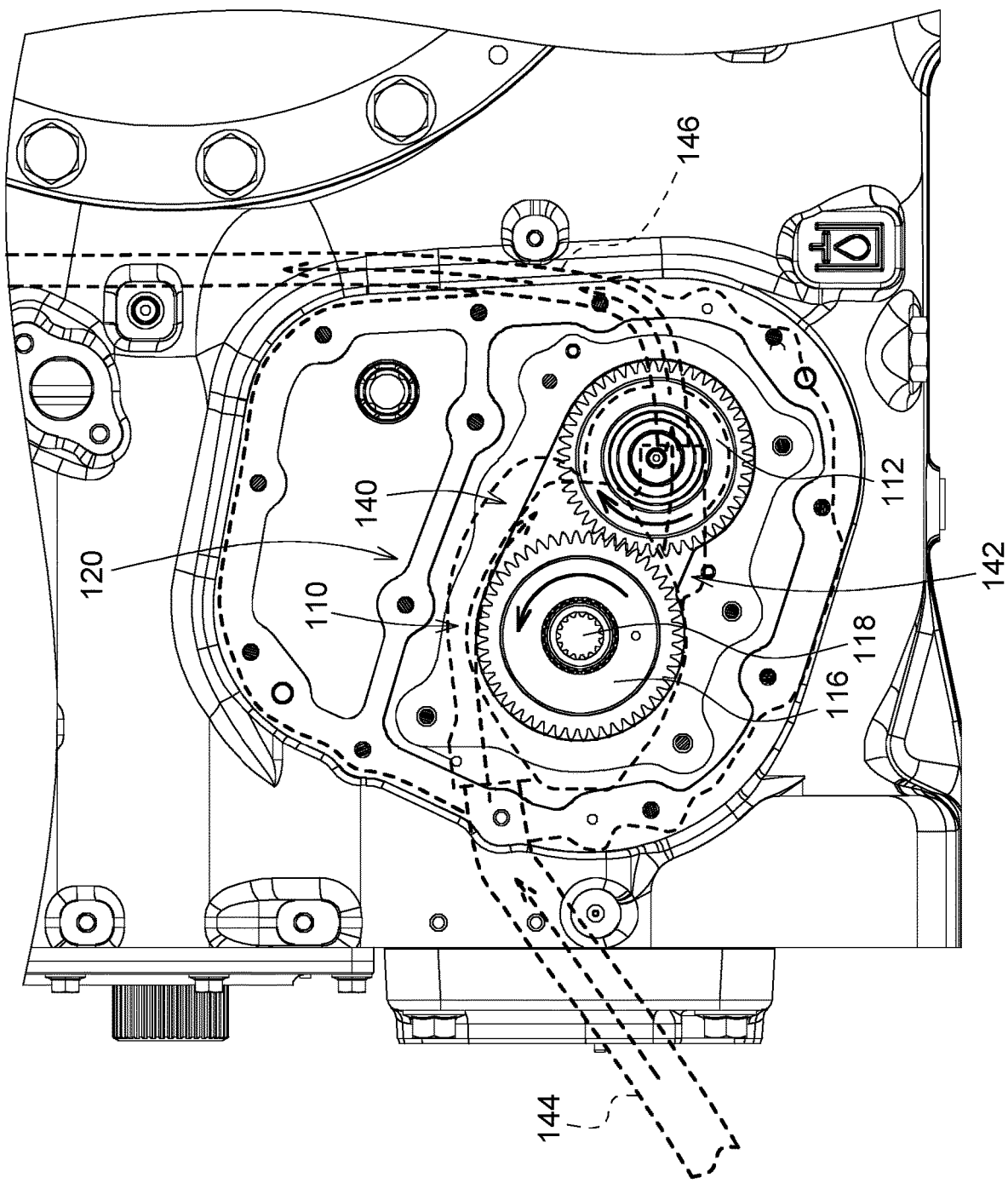
FIG. 5 is a front perspective view of a drivetrain component, according to an implementation.
Figure 6:
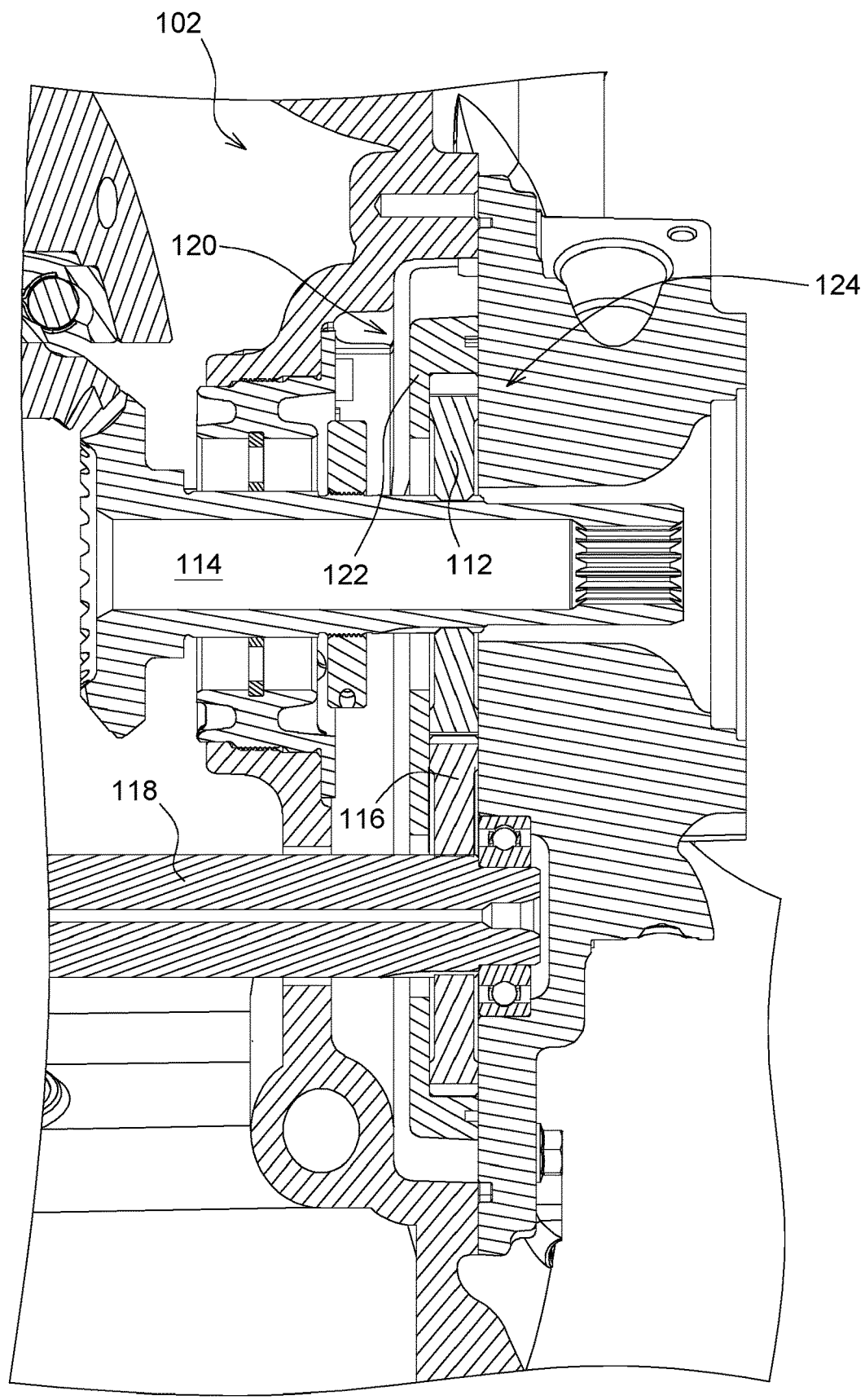
FIG. 6 is a cross-sectional view of a drivetrain component, according to an implementation.
Figure 7:
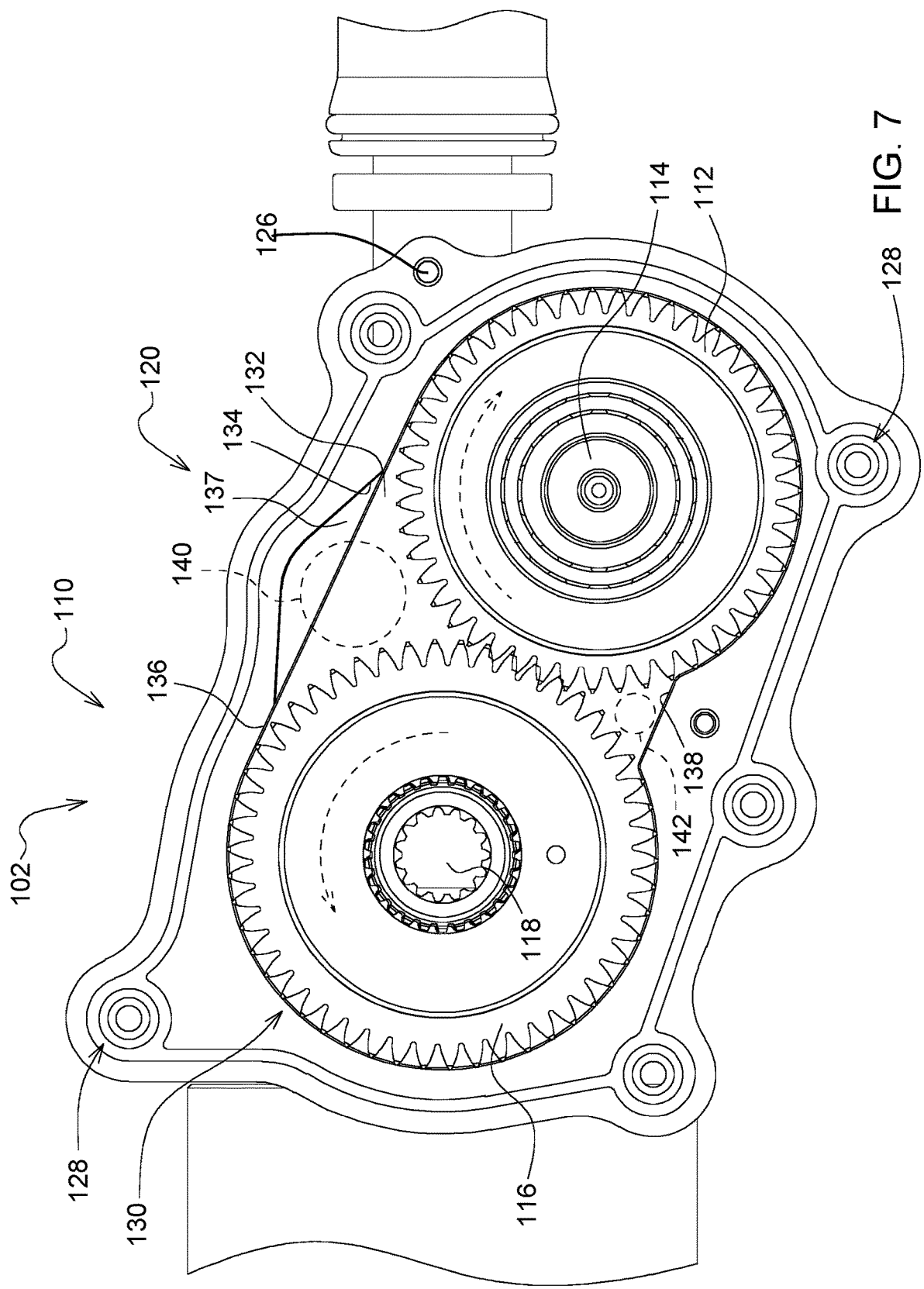
FIG. 7 is a front perspective view of a drivetrain component, according to an implementation.
Figure 8:
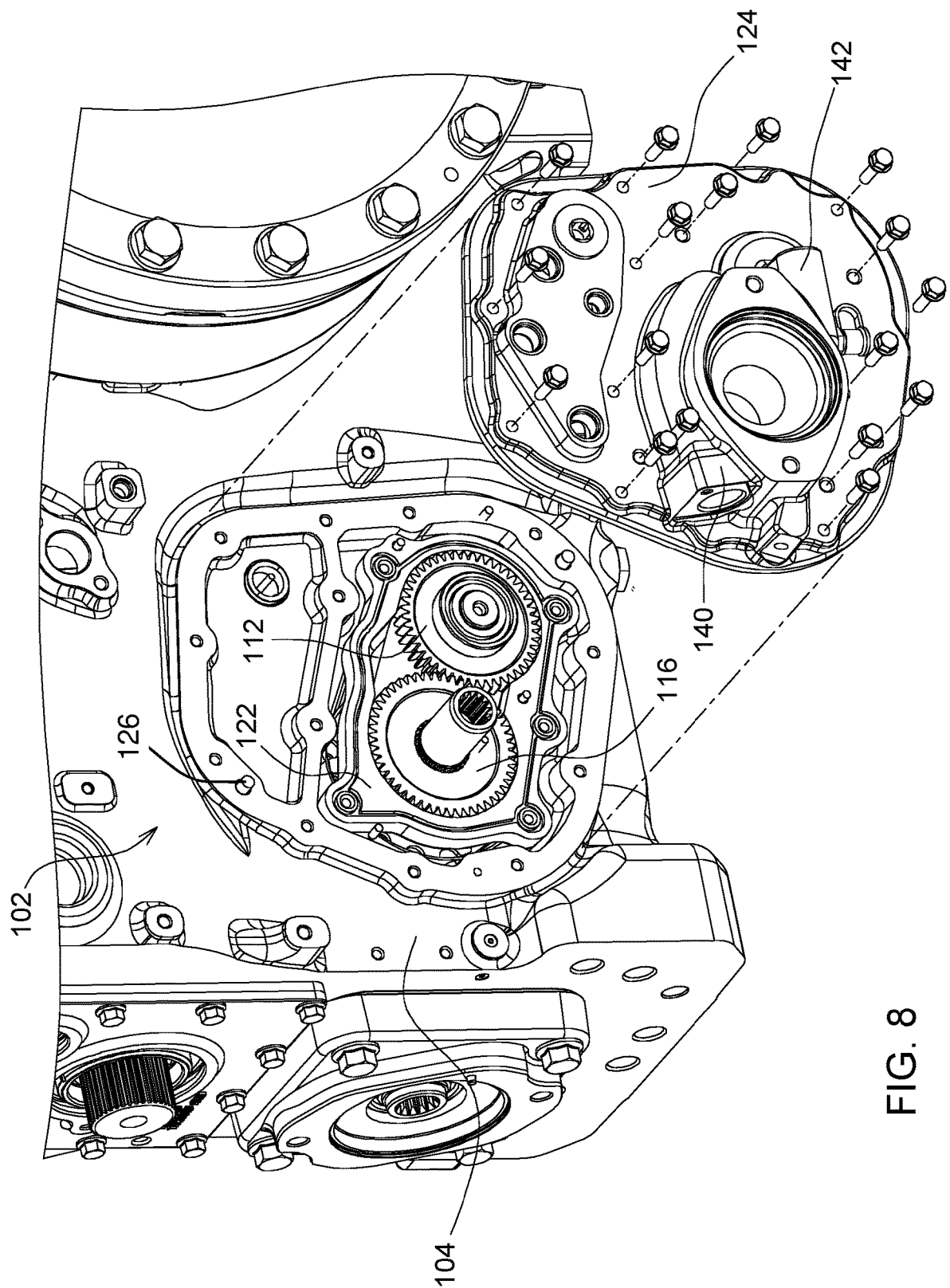
FIG. 8 is an assembly view of a drivetrain component, according to an implementation.
Figure 9:
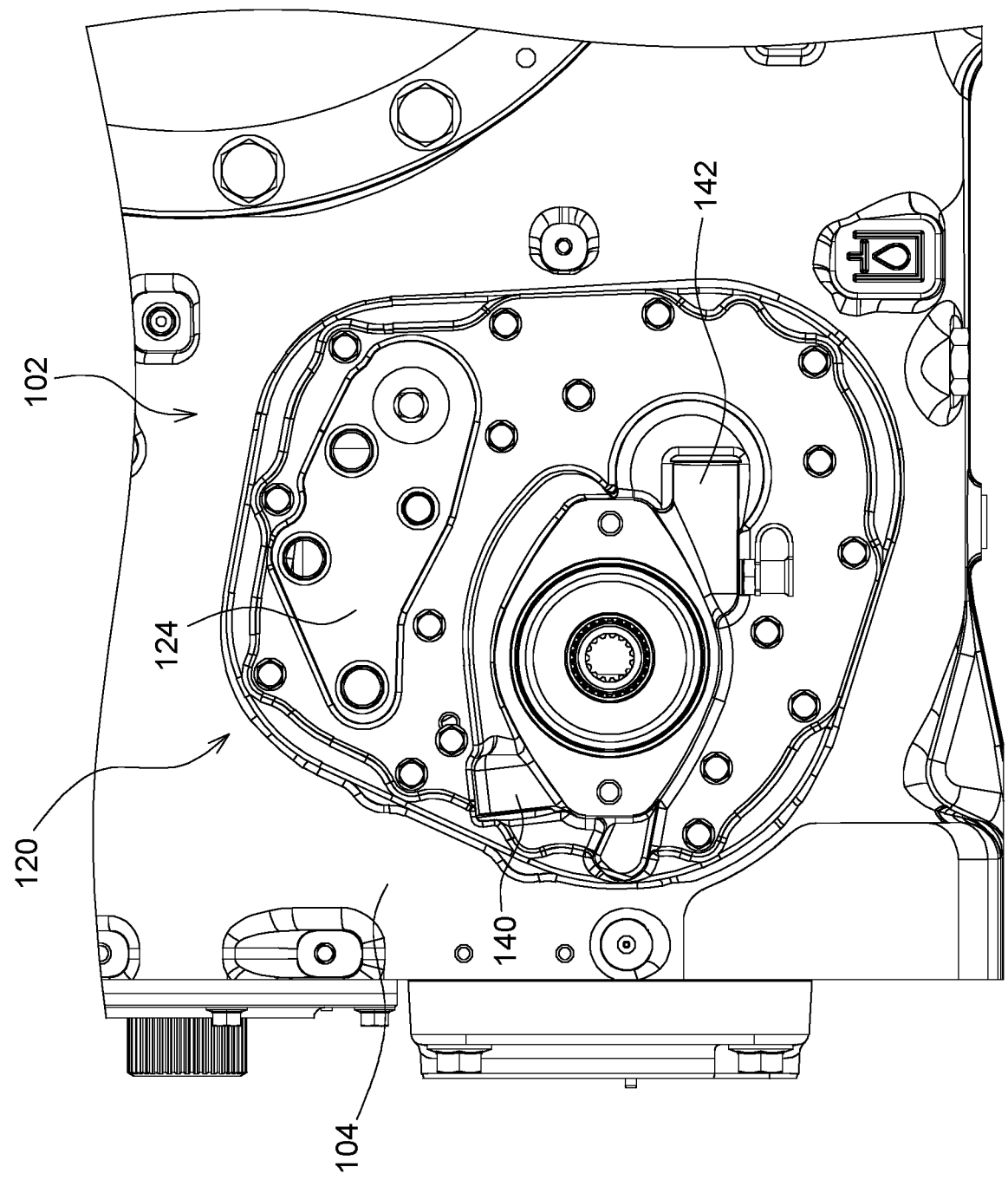
FIG. 9 is a front perspective view of a drivetrain component, according to an implementation.
Figure 10:
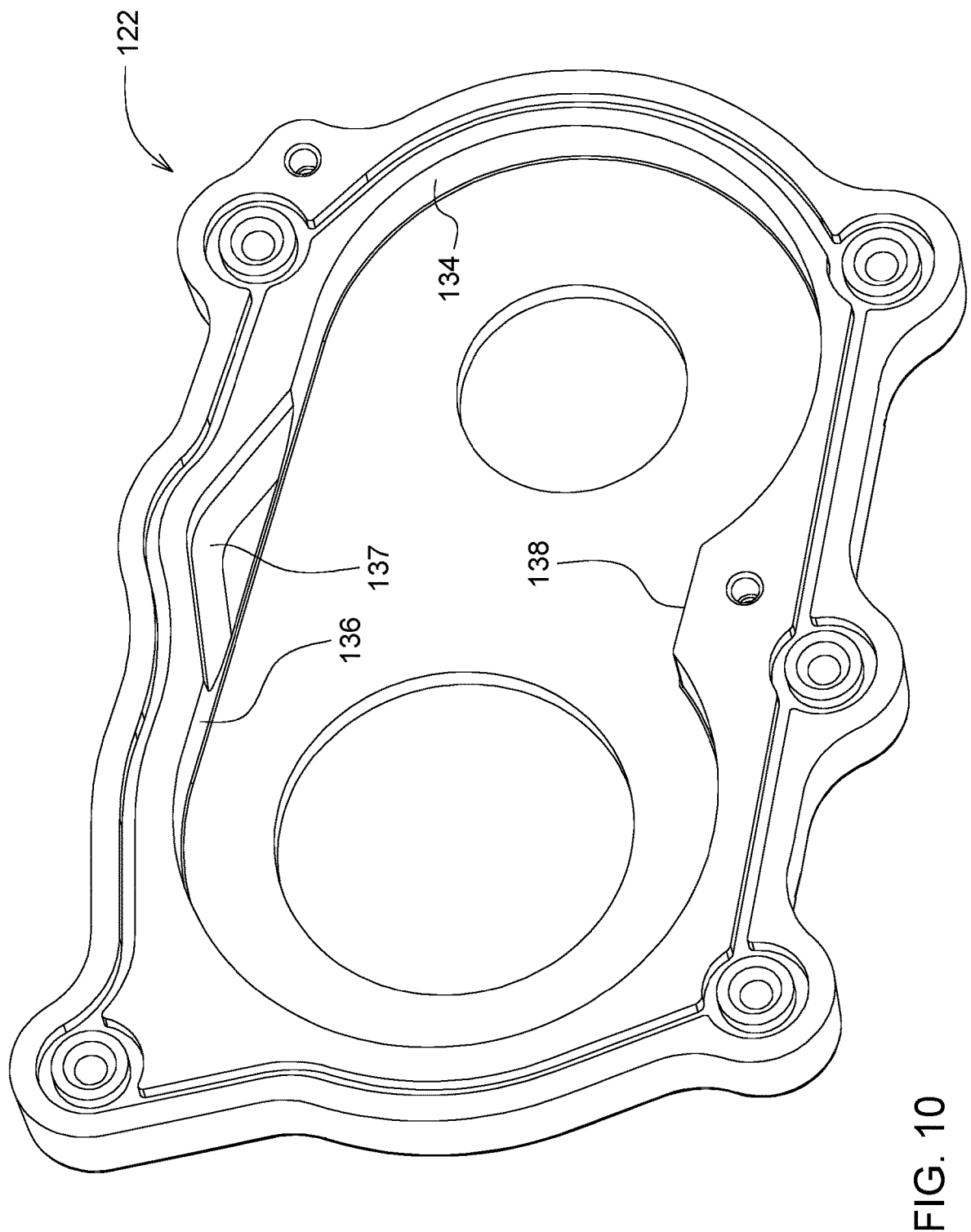
FIG. 10 is a perspective view of an interior of an inner housing of a drivetrain component, according to an implementation.
Figure 11:
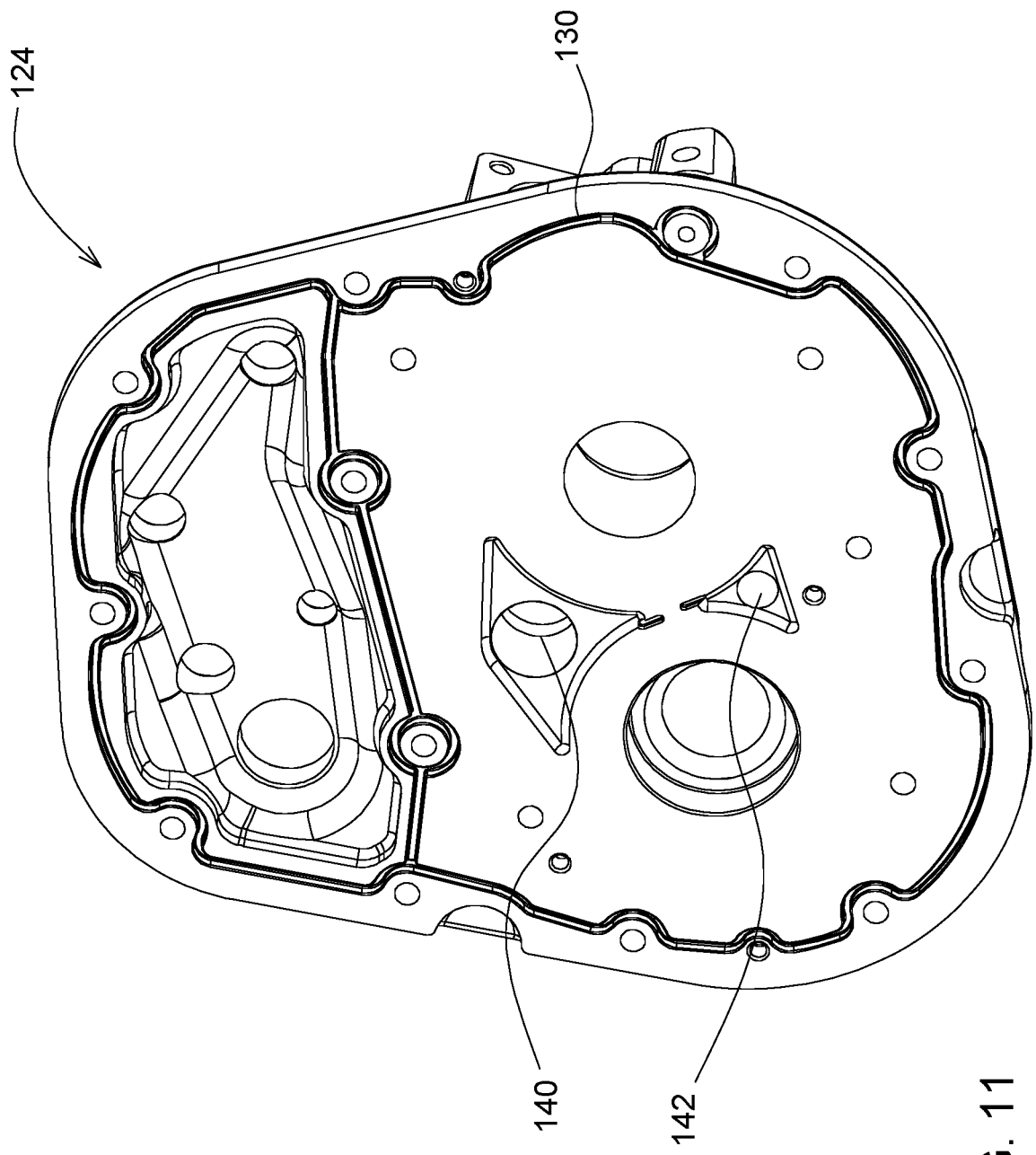
FIG. 11 is a perspective view of an interior of an outer housing of a drivetrain component, according to an implementation.

With reference to FIGS. 1-11, a drivetrain component 102 can be a transmission, a differential, a final drive, a gearbox, a gear pump, an electric machine, a hydraulic machine, a pair of gears, or any other set of gears transferring or transmitting torque in a drivetrain. The drivetrain component 102 can be utilized in any stationary or mobile application. According to some implementations, the drivetrain component 102 can be set of gears or a gear pump in any industrial or manufacturing environment. According to other implementations, the drivetrain component 102 can be set of gears or a gear pump in a work vehicle 100, for example an agricultural tractor or implement. This disclosure also applies to other types of work vehicles or implements in agriculture, lawn, garden, turf, construction, forestry, and road building. The stationary or mobile application can include one or more power sources 101, for example an internal combustion engine, a hybrid engine, an electric or hydraulic machine, or any combination of these, and one or more drivetrain components 102. A work vehicle 100 can include one or more drivetrain components 102 in the drivetrain from a power source 101 to one or more ground engaging apparatus (e.g., wheels, track assemblies, etc.).

The drivetrain component 102 can include an outer housing 104. The drivetrain component 102 transfers or transmits torque from an input to an output, for example from an input shaft 106 to an output shaft 108. Each of the input and output shafts 106, 108 can include one or more gear pairs, including a first gear on the input shaft 106 engaging or meshing with a second gear on the output shaft 108. The drivetrain component 102 can include one or more intermediate shafts between the input and output shafts 106, 108. The drivetrain component 102 transfers or transmits torque to an additional drivetrain component 102A. The drivetrain component 102 transfers fluid between an inlet 140 and an outlet 142. The drivetrain component 102 can function as both a torque transfer device and a gear pump. Either function can be a primary or secondary function, or both functions can be equivalent. According to some implementations, the drivetrain component 102 functions a gear pump and transfers torque to another or a second gear pump. Two or more gear pumps can be connected, with each receiving power or torque from the preceding gear pump.

A drivetrain component 102 can include a set of gears 110 having a first gear 112 on a first shaft 114 and a second gear 116 on a second shaft 118. The set of gears 110 transfers or transmits torque from the first shaft 114 to the second shaft 118 through the engagement or meshing of the first gear 112 with the second gear 116. The first shaft 114 can be the same as or different from the input shaft 106. The first shaft 114 can receive torque directly or indirectly from the input shaft 106. The first shaft 114 can receive torque directly or indirectly from a power source 101. The first shaft 114 can receive torque directly or indirectly from an additional drivetrain component 102A, for example from a gearbox, a transmission, or a power-take-off (PTO). The first shaft 114 can receive any combination of constant or varying torque at a constant or varying speed. The second shaft 118 can be the same as or different from the output shaft 108. The second shaft 118 can transmit torque directly or indirectly to the output shaft 108. The second shaft 118 can transmit torque directly or indirectly to one or more other drivetrain components, for example to a gear pump, a power-take-off (PTO), a transmission, a gearbox, a final drive, or one or more ground engaging apparatus of a work vehicle. The first shaft 114 can be an input shaft or an intermediate shaft within the drivetrain component 102. The second shaft 118 can be an output shaft or an intermediate shaft within the drivetrain component 102.

A housing 120 at least partially surrounds the set of gears 110. The housing 120 can include an inner housing 122 and an outer housing 124. The housing 120 can include an inlet 140 and an outlet 142. The housing 120 is at least partially positioned around the set of gears 110 so that the first and second gears 112, 116 create a flow of fluid within the housing 120. The housing 120 can form an enclosure around the first and second gears 112, 116. The fluid flows from the inlet 140 around the outside of the first and second gears 112, 116 between the gear teeth and the housing 120. The fluid flows from between the gear teeth and the housing out through the outlet 142 before or as the gear teeth engage or mesh. The inlet 140 and the outlet 142 can be on the same side or on opposite sides of the housing 120. The inlet 140 can be larger, smaller, or the same size as the outlet 142. The inlet 140 can have a larger, smaller, or the same diameter as the outlet 142.

The housing 120 for the first and second gears 112, 116 can be the same as or can be separate from the outer housing 104 of the drivetrain component 102. The housing 120 for the first and second gears 112, 116 can be integral with the outer housing 104 of the drivetrain component 102. The inner housing 122 can be separate from or integral with the outer housing 104 of the drivetrain component 102. The outer housing 124 can be separate from or integral with the outer housing 104 of the drivetrain component 102. The inner and outer housings 122, 124 can both be separate from or integral with the outer housing 104 of the drivetrain component 102. One of the inner and outer housings 122, 124 can be separate from the outer housing 104 of the drivetrain component 102 and the other one of the inner and outer housings 122, 124 can be integral with the outer housing 104 of the drivetrain component 102.

The inner housing 122, the outer housing 124, or both can include alignment features 126, such as dowels or pins and corresponding apertures or recesses, to aid or assist in assembly of the housing 120. One or more fasteners 128 can connect or attach the inner and outer housings 122, 124. A seal 130 can be positioned between the inner and outer housings 122, 124 to reduce or prevent fluid from leaking out of the housing 120, for example between the inner and outer housings 122, 124. The housing 120 forms an interior 132 containing the first and second gears 112, 116. The interior 132 can have a smaller, larger, or same size cavity or space on the inlet 140 side of the first and second gears 112, 116 than on the outlet 142 side. An internal boundary or wall 134 of the housing 120 defines the interior 132. The wall 134 can include a substantially straight or linear portion 136 from an outer diameter of the first gear 112 to an outer diameter of the second gear 116 on the inlet 140 side. The linear portion 136 creates a larger cavity or space for the inlet 140 compared to the outlet 142. The wall 134 can include a recessed portion 137 positioned between an outer diameter of the first gear 112 to an outer diameter of the second gear 116 on the inlet 140 side. The linear portion 136 can include the recessed portion 137. The recessed portion 137 creates an even larger cavity or space for the inlet 140 compared to the outlet 142. As shown for example in FIGS. 5, 7, 8, and 10, the larger cavity forms a continuous open space extending between the outer diameters of the first and second gears 112, 116 and the recessed portion 137, such that the wall 134 is spaced farther apart from the outer diameters of the first and second gears 112, 116 on the inlet side 140 than the outlet side 142. The wall 134 can include a raised portion 138 positioned inward from the wall 134 and extending between the first and second gears 112, 116 on the outlet 142 side of the first and second gears 112, 116. The raised portion 138 creates a smaller cavity or space for the outlet 142 compared to the inlet 140.

The first and second gears 112, 116 can perform multiple functions. The first and second gears 112, 116 transfer torque between the first and second shafts 114, 118. In addition, the first and second gears 112, 116 create a gear pump within the housing 120 while transferring torque between the first and second shafts 114, 118. According to some implementation, a first function of the set of gears 110 is to transfer torque from the first shaft 114 to the second shaft 118 so that the second shaft 118 can provide torque to an additional drivetrain component 102A, and second function is to pump fluid from the inlet 140 of the housing 120 to the outlet 142 of the housing when the first and second gears 112, 116 are rotating. A first line 144 can connect to the inlet 140 providing fluid from a source or supply of fluid. A second line 146 can connect to the outlet 142 providing fluid to a use, requirement, or demand of fluid.

During operation of the drivetrain component 102, the first shaft 114 receives rotational power or torque from a power source 101 or a preceding drivetrain component 102. For example, the first shaft 114 receives rotational power from a power-take-off (PTO) shaft. The first gear 112 rotates with the first shaft 114. The second gear 116 rotates based on the engagement with the first gear 112. The second shaft 118 rotates with the second gear 116. The second shaft 118 provides rotational power or torque to a subsequent drivetrain component 102. For example, the second shaft 118 provides rotational power to another or a second gear pump. The subsequent drivetrain component 102 can provide rotational power or torque to one or more further subsequent drivetrain components 102.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example implementations of the present disclosure, these descriptions should not be viewed in a restrictive or limiting sense. Rather, there are several variations and modifications which may be made without departing from the scope of the appended claims.

What is claimed is:

1. A drivetrain component, comprising:
a first gear positioned on a first shaft configured to receive torque from a power source via a power-take-off;
a second gear positioned on a second shaft, the second gear engaged with the first gear transmitting torque from the first shaft to the second shaft, the second shaft configured to transfer torque received from the first shaft to a set of gears; and
a housing including a wall partially surrounding the first and second gears, the housing including an inlet on an inlet side of the first and second gears and an outlet on an outlet side of the first and second gears, the inlet being larger than the outlet, the wall having a recessed portion positioned between an outer diameter of the first gear and an outer diameter of the second gear on the inlet side, the recessed portion creating a larger cavity for the inlet, the wall having a raised portion positioned inward from the wall and extending between the first and second gears on the outlet side, the raised portion creating a smaller cavity for the outlet, the larger cavity forming a continuous open space extending between the outer diameters of the first and second gears and the recessed portion, such that the wall is spaced farther apart from the outer diameters of the first and second gears on the inlet side than the outlet side, and rotation of the first and second gears transferring fluid from the inlet to the outlet.

2. The drivetrain component of claim 1, wherein the set of gears includes one of a differential, a final drive, and a gearbox.

3. The drivetrain component of claim 1, wherein the inlet is connected to a fluid source.

4. The drivetrain component of claim 1, wherein the outlet is connected to a fluid use.

5. The drivetrain component of claim 1, wherein the drivetrain component is utilized in a mobile application.

6. A drivetrain component, comprising:
a first shaft including a first gear, the first shaft configured to receive torque from a power source via a power-take-off;
a second shaft including a second gear engaged with the first gear, the second shaft configured to transfer torque received from the first shaft to a set of gears; and
a housing including a wall partially surrounding the first and second gears, the housing including an inlet on an inlet side of the first and second gears and an outlet on an outlet side of the first and second gears, the inlet being larger than the outlet, the wall having a recessed portion positioned between an outer diameter of the first gear and an outer diameter of the second gear on the inlet side, the recessed portion creating a larger cavity for the inlet, the wall having a raised portion positioned inward from the wall and extending between the first and second gears on the outlet side, the raised portion creating a smaller cavity for the outlet, the larger cavity forming a continuous open space extending between the outer diameters of the first and second gears and the recessed portion, such that the wall is spaced farther apart from the outer diameters of the first and second gears on the inlet side than the outlet side, and the first and second gears configured to transfer fluid from the inlet to the outlet.

7. The drivetrain component of claim 6, wherein the set of gears includes one of a differential, a final drive, and a gearbox.

8. The drivetrain component of claim 6, wherein the inlet is connected to a fluid source.

9. The drivetrain component of claim 6, wherein the outlet is connected to a fluid use.

10. The drivetrain component of claim 6, wherein the drivetrain component is utilized in a mobile application.

11. A work vehicle, comprising:
a power source;
a first shaft having a first gear receiving torque from the power source via a power-take-off;
a second shaft having a second gear engaged with the first gear;
a housing including a wall partially surrounding the first and second gears, the housing including an inlet on an inlet side of the first and second gears and an outlet on an outlet side of the first and second gears, the inlet being larger than the outlet, the wall having a recessed portion positioned between an outer diameter of the first gear and an outer diameter of the second gear on the inlet side, the recessed portion creating a larger cavity for the inlet, the wall having a raised portion positioned inward from the wall and extending between the first and second gears on the outlet side, the raised portion creating a smaller cavity for the outlet, the larger cavity forming a continuous open space extending between the outer diameters of the first and second gears and the recessed portion, such that the wall is spaced farther apart from the outer diameters of the first and second gears on the inlet side than the outlet side, and rotation of the first and second gears transferring fluid from the inlet to the outlet; and
a set of gears, the second shaft transferring the torque received from the first shaft to the set of gears.

12. The work vehicle of claim 11, wherein the set of gears includes one of a differential, a final drive, and a gearbox.

13. The work vehicle of claim 11, wherein the inlet is connected to a fluid source.

14. The work vehicle of claim 11, wherein the outlet is connected to a fluid use.

\* \* \* \* \*